(12) United States Patent
Döhring (10) Patent No.: US 11,560,721 B2
(45) Date of Patent: Jan. 24, 2023

(54) FLOOR PANEL HAVING DRAINAGE PROTRUSIONS

(71) Applicant: Kronoplus Technical AG, Niederteufen (CH)

(72) Inventor: Dieter Döhring, Großenhain (DE)

(73) Assignee: Xylo Technologies AG, Niederteufen (CH)

( * ) Notice: Subject to any disclaimer, the term of this patent is extended or adjusted under 35 U.S.C. 154(b) by 0 days.

(21) Appl. No.: 16/065,181

(22) PCT Filed: Dec. 23, 2015

(86) PCT No.: PCT/EP2015/081137
§ 371 (c)(1),
(2) Date: Jun. 22, 2018

(87) PCT Pub. No.: WO2017/108124
PCT Pub. Date: Jun. 29, 2017

(65) Prior Publication Data
US 2019/0003189 A1   Jan. 3, 2019

(51) Int. Cl.
*E04F 15/02* (2006.01)
*B32B 3/30* (2006.01)
(Continued)

(52) U.S. Cl.
CPC .......... *E04F 15/02183* (2013.01); *B32B 3/06* (2013.01); *B32B 3/085* (2013.01);
(Continued)

(58) Field of Classification Search
CPC .............. E04F 15/185; E04F 15/02183; E04F 15/02188; E04F 13/0869; E01C 13/045
See application file for complete search history.

(56) References Cited

U.S. PATENT DOCUMENTS 4,018,025 A * 4/1977 Collette ............ E04F 15/02188
52/302.3
4,287,693 A * 9/1981 Collette .................... B32B 3/06
52/302.1
(Continued)

FOREIGN PATENT DOCUMENTS

CA    2915713    12/2014
CA    2922235    3/2015
(Continued)

OTHER PUBLICATIONS

International Search Report and Written Opinion of the ISA for PCT/EP2015/081137, dated Aug. 22, 2016.
(Continued)

*Primary Examiner* — Brent W Herring
*Assistant Examiner* — Daniel J Kenny
(74) *Attorney, Agent, or Firm* — Renner, Otto, Boisselle & Sklar, LLP (57) ABSTRACT

The present invention relates to a floor panel 10, in particular for the outdoor area or wet areas, with a carrier plate 11 having a front face and rear face, wherein the carrier plate 11 is provided on its front face with a décor and/or protective layer 16. For drainage of liquids and in particular of water, on the rear face of the carrier plate 11 drainage protrusions 22, 24, 26, 32 are applied.

14 Claims, 4 Drawing Sheets

(51) Int. Cl.
  *B32B 5/02* (2006.01)
  *B32B 7/12* (2006.01)
  *B32B 13/02* (2006.01)
  *B32B 13/12* (2006.01)
  *B32B 3/06* (2006.01)
  *B32B 21/06* (2006.01)
  *B32B 27/08* (2006.01)
  *B32B 27/12* (2006.01)
  *B32B 21/02* (2006.01)
  *B32B 29/02* (2006.01)
  *B32B 27/00* (2006.01)
  *B32B 27/10* (2006.01)
  *B32B 27/30* (2006.01)
  *B32B 3/08* (2006.01)
  *B32B 21/08* (2006.01)
  *B32B 3/10* (2006.01)
  *B32B 13/08* (2006.01)
  *B32B 5/14* (2006.01)
  *B32B 13/14* (2006.01)
  *B32B 19/04* (2006.01)
  *E04F 15/08* (2006.01)
  *E04F 15/10* (2006.01)

(52) U.S. Cl.
  CPC ............ *B32B 3/10* (2013.01); *B32B 3/30* (2013.01); *B32B 5/022* (2013.01); *B32B 5/145* (2013.01); *B32B 7/12* (2013.01); *B32B 13/02* (2013.01); *B32B 13/08* (2013.01); *B32B 13/12* (2013.01); *B32B 13/14* (2013.01); *B32B 19/042* (2013.01); *B32B 19/045* (2013.01); *B32B 21/02* (2013.01); *B32B 21/06* (2013.01); *B32B 21/08* (2013.01); *B32B 27/00* (2013.01); *B32B 27/08* (2013.01); *B32B 27/10* (2013.01); *B32B 27/12* (2013.01); *B32B 27/304* (2013.01); *B32B 29/02* (2013.01); *E04F 15/02038* (2013.01); *E04F 15/02188* (2013.01); *E04F 15/08* (2013.01); *E04F 15/107* (2013.01); *B32B 2255/12* (2013.01); *B32B 2255/26* (2013.01); *B32B 2260/026* (2013.01); *B32B 2260/028* (2013.01); *B32B 2260/046* (2013.01); *B32B 2262/10* (2013.01); *B32B 2262/101* (2013.01); *B32B 2262/108* (2013.01); *B32B 2307/536* (2013.01); *B32B 2307/7265* (2013.01); *B32B 2307/732* (2013.01); *B32B 2471/00* (2013.01); *B32B 2607/00* (2013.01); *E04F 2201/0153* (2013.01); *E04F 2201/043* (2013.01); *E04F 2203/00* (2013.01)

(56) References Cited

U.S. PATENT DOCUMENTS

| | | | | |
|---|---|---|---|---|
| 5,067,298 A | * | 11/1991 | Petersen | E04D 13/1662 52/742.14 |
| 5,666,772 A | | 9/1997 | Betty | |
| 6,161,353 A | * | 12/2000 | Negola | E04C 2/205 428/167 |
| 7,584,583 B2 | * | 9/2009 | Bergelin | E04F 15/02 52/588.1 |
| 7,832,150 B1 | * | 11/2010 | Pratt | E04B 1/7023 52/169.5 |
| 8,769,895 B2 | * | 7/2014 | Amend | B32B 27/065 52/309.4 |
| 9,339,981 B2 | * | 5/2016 | Masanek, Jr. | B29D 99/0057 |
| 9,551,509 B2 | * | 1/2017 | Port | E04B 1/38 |
| 9,663,229 B2 | * | 5/2017 | Funk | B64D 11/003 |
| 9,850,668 B2 | * | 12/2017 | Della Pepa | B32B 3/02 |
| 10,350,980 B2 | * | 7/2019 | Hortrich | B60J 7/043 |
| 2001/0051252 A1 | * | 12/2001 | Voyer | E04F 15/185 428/150 |
| 2003/0074853 A1 | | 4/2003 | Potter | |
| 2005/0279574 A1 | * | 12/2005 | Halterbeck | B32B 3/26 181/293 |
| 2006/0096223 A1 | * | 5/2006 | Kyoung Taek | E04F 15/206 52/578 |
| 2006/0230701 A1 | * | 10/2006 | Pepa | B29C 70/78 52/592.1 |
| 2007/0062139 A1 | * | 3/2007 | Jones | E04F 15/185 52/403.1 |
| 2008/0086958 A1 | * | 4/2008 | Schroer | E02D 31/02 52/169.14 |
| 2008/0118703 A1 | | 5/2008 | Sansano Marti | |
| 2008/0295438 A1 | * | 12/2008 | Knauseder | E04B 9/0435 52/589.1 |
| 2010/0068469 A1 | * | 3/2010 | Wiemers | E04F 15/182 156/245 |
| 2010/0223872 A1 | * | 9/2010 | Taylor | E04F 13/0887 52/309.3 |
| 2012/0124925 A1 | * | 5/2012 | Prinz | E01C 5/18 52/302.1 |
| 2013/0055665 A1 | * | 3/2013 | Qiong | B32B 7/12 52/177 |
| 2013/0086866 A1 | * | 4/2013 | Merryman | B60R 13/0892 52/741.4 |
| 2014/0057076 A1 | | 2/2014 | Pepa | |
| 2015/0233127 A1 | * | 8/2015 | Dohring | E04F 15/02183 52/177 |

FOREIGN PATENT DOCUMENTS

| | | | |
|---|---|---|---|
| CN | 104703791 | | 7/2015 |
| DE | 10 2011 004893 A1 | | 9/2012 |
| KR | 20020060721 | | 7/2002 |
| RU | 2392402 | | 6/2010 |
| WO | WO-2014053186 A1 | * | 4/2014 ........ E04F 15/02183 |
| WO | 2017108124 A1 | | 6/2017 |

OTHER PUBLICATIONS

International Preliminary Report on Patentability for PCT/EP2015/081137, dated Mar. 12, 2018.

Russian Decision on Granting for Patent Application No. 2018124862/03(039443), dated May 27, 2019, with English Translation.

\* cited by examiner

FLOOR PANEL HAVING DRAINAGE PROTRUSIONS

This application is a national phase of International Application No. PCT/EP2015/081137 filed Dec. 23, 2015 and published in the English language, which is hereby incorporated herein by reference in its entirety.

FIELD OF THE INVENTION

The present invention relates to floor panels which are in particular suitable for outdoor areas or wet areas and which can drain water in an improved manner, as well as the use of such floor panels.

BACKGROUND OF THE INVENTION

In the art, a plurality of floor panels is known. For outdoor areas, i.e. outside of closed rooms, where the floors are exposed to atmospheric influence more or less without being protected, as well as in wet areas, such as in the field of swimming pools and the like, typically solid wood boards are used, which are suitably impregnated. To drain surface water, such as rain water or dripping water, these boards are typically mounted on a solid cross beam and in the outer area additionally installed on a gravel or sand bed. The cross beams are normally sufficiently dimensioned so that the underside respectively the rear face of the boards are spaced apart from the ground.

For the indoor area, in the recent years, particularly so called laminate panels are widely spread. Laminate panels are relatively inexpensive and are easy to install. They are typically based on a carrier plate of MDF- or HDF-material on which top face (front face) multiple resin impregnated papers are applied. Such laminate panels are not 25 suitable for the use in an outdoor area or in a wet area (such as e.g. bathrooms, spa areas, indoor swimming pools etc.). The carrier board of MDF or HDF is not moisture resistant and swells under longer water contact. The typically used décor papers further are not sufficiently UV resistant, so that the printing colors age over time, so that the décor will be unsightly after a short period of time. Document DE 10 2011 004893 A1 relates to a composite tile for a system to be laid, in particular for making a floor or wall covering, comprising a tile of a floor or wall covering and a support that is arranged on the side on which the tile contacts the floor or wall. The support is made of a fiber composite, in particular fiber-reinforced cement.

The known laminate panels have in common the advantage that the use of so called click connection profiles is possible, namely special tongue and groove connection profiles provided on the edges of the panels, which allow a simple interconnecting by an angular movement around the connecting profiles, so that installing of the panels is simply possible for a layman.

In WO 2014/053 186 of the same applicant, an improved floor panel for the outdoor area is disclosed, which combines the advantages of known laminate panels for the indoor area with suitable materials and surfaces for a use in outdoor areas. In this document, floor panels are suggested having connecting means in form of tongue and groove elements, wherein the panels comprise a carrier plate which consists of MDF or HDF of acetylated wood, fiber cement or of polyvinylchloride. On the front face of the floor panels a special décor respectively protection layer is applied, which is in particular suitable for being used in the outdoor area. To allow the drainage of for example rain water, in particular with regard to these floor panels, the floor underground should be provided with a layer, respectively a bed, of gritting material or gravel, or the like and the panels should be installed on that gritting material layer. Water can therefore flow off the gaps between the installed floor panels into the gritting material bed and can be suitably conducted or seeped away into the earth. The gritting material further prevents that the rear faces of the installed panels lay for a longer period of time in a standing water puddle, which would also be permanently harmful for the suitable basis materials of these floor panels. For draining water, and for protecting the flooring in outdoor or indoor areas with high moisture strain (i.e. wet area, such as in the area of swimming pools or the like usually surface drainages are used). Surface drainages typically consist of a mesh of a suitable polymer and are installed between the ground and the floor panels. The floor panels or plates rest on the mesh of the surface drainage. Such a surface drainage allow fast drainage, however has a disadvantage in that an additional installing step is necessary and high costs for this surface drainage occur.

The present invention has the object to improve the known state of the art and in particular to provide improved floor panels which provide the advantages of known laminate panels for the indoor area with respect to the simplicity of installation and which preferably allow omitting separate surface drainages and/or gravel or drain material beds. These and other objects, which will be named during reading of the following description will become apparent for a person skilled in the art and are solved with a floor panel as described herein.

DETAILED DESCRIPTION OF THE INVENTION

The floor panels of the present invention include a carrier plate having a front face and rear face, wherein the carrier plates are provided with a décor and/or protective layer on their front face. On the sides, the carrier plate comprises preferably coupling means in the form of tongue and groove elements, which allow a connection of multiple similar panels in directions parallel to the front face as well as perpendicular to the front face by means of form fit. The coupling means are preferably provided on all sides respectively edges of the floor panels. On the rear face of the carrier plate, drainage protrusions are provided. The drainage protrusions are therefore fixedly connected with the carrier plate or integrally formed with the carrier plate, such that during installation of such floor panels no separate surface drainages in form of e.g. meshes are necessary (although, these can be used additionally, if it should be desired or necessary). Since the drainage protrusions are pre-fabricated on the floor panels, the installation of those floor panels is in particular easy and fast. Due to the drainage protrusions, the use of gravel, sand or gritting material beds is generally superfluous and the floor panels can be installed directly on a planar and solid ground. Of course it is also possible to additionally provide such a gravel, sand or gritting material bed, if it is desired.

Preferably, the drainage protrusions are adhered on the rear face of the carrier plate i.e. the drainage protrusions can be separate components which are adhered to the rear face with a suitable adhesive. Particularly preferred, a melt adhesive is used for adhering the drainage protrusions on the rear face, particularly a melt adhesive based on polyurethane or polyolefin. Such melt adhesives are easy and fast to process and offer a high weather resistance.

Preferably, the drainage protrusions consist of a melt adhesive. The drainage protrusions therefore are no separate components, which are adhered with an adhesive on the rear face of the carrier plate, but rather suitable thick melt adhesive strips or points are applied on the rear face. After curing, respectively cooling, these adhesive strips form the inventive drainage protrusions. If it is herein described that the drainage protrusions on the rear face of the carrier plate are adhered, embodiments are also covered, wherein the drainage protrusions themselves consist of an adhesive, respectively of an used adhesive. Manufacturing the drainage protrusions from the adhesive itself provides great advantages with regard to manufacturing: The carrier plate, respectively floor panels simply have to be guided under respectively arranged adhesive nozzles, so that the protrusions can be applied precisely with low technical equipment and with high throughput speeds. The adhesive applying device can be readily integrated in the normal transport process of the floor panels so that the panels have not to be removed from the manufacturing process for the application of the drainage protrusions. The production speed therefore can be maintained at a high level.

Preferably, the melt adhesive is a reactive adhesive, particularly from the group of polyurethanes or thermoplastic melt adhesives with a resistance to thermal distortion of at least 45° C. The resistance to thermal distortion is important, that the drainage protrusions have a sufficient stability, even under increased temperatures, in order to maintain their shape.

Preferably, the drainage protrusions comprise circular protrusions and/or elongated ribs. Thereby the ribs can extent over the full length or width of a panel as well as perpendicular thereto, or they are particularly preferred provided along their longitudinal extension with multiple interruptions. If the panels are transported e.g. under the nozzles, through which the material for the protrusions is applied and applied on the rear face of a panel, it is easier, if the nozzles are clocked such that the formed rib is built in form of multiple small single ribs. For each of these forms, a short impulse of the nozzle is applied. The final form of the rib, respectively the ribs, is dependent on the nozzle form, the clocking and the feeding speed during output. This is advantageous with regard to continuous ribs, since the border area of panels can remain free, which allows an improved machining of the profile. Further, the drainage is further improved and is not direction dependent.

Preferably, the drainage protrusions are oriented parallel to each other and define there between open channels. The open channels serve for the drainage of e.g. rain or ground water under the floor panels, if the drainage protrusions rest on the ground or floor. Between the virtual ground and the rear face or underside of the floor panels thus, flow channels are built, through which the water can be drained and air can flow, in order to dry the rear face, respectively underside, of the installed panels.

Particularly preferable, the drainage protrusions extend in particular over the complete area of the rear face. Particularly preferably, the drainage protrusions are thereby provided in parallel rows, such that in the installed state between two or more floor panels the drainage protrusions of the adjacent panels fall in line with each other, so that that the open channels extend over multiple adjacent panels. This allows a particular efficient drainage of fluid.

Preferably, the drainage protrusions have a width of 2-40 mm, even more preferably from 3-25 mm, and most preferably of 3-15 mm. It has shown that these widths are sufficiently strong to provide a secure resting of a floor panel. Particular, for the case that the drainage protrusions consist of an adhesive, these widths are well suitable, since the adhesive strips in these widths can be manufactured, respectively applied, simple and good.

Preferably, the drainage protrusions have a height of 2-10 mm, even more preferably from 2-8 mm, and most preferably from 3-6 mm. The height of the drainage protrusions defines the distance of the rear face, respectively underside, of the panels from the ground. Due to the chosen height of the drainage protrusions, flowing or drainage channels between the protrusions of sufficient height are formed, in order to provide a secure drainage, even under high appearance of drainable water.

Preferably, the drainage protrusions comprise elongated ribs, that are oriented parallel to each other and define open channels between themselves, wherein the distance between the peaks of the drainage ribs is 2-15 mm, preferably 4-12 mm and most preferably 5-10 mm. Under such a distance between the peaks of the ribs (measured from mid to mid of adjacent ribs) sufficiently big open channels are formed and the ribs form a sufficient strong rest for the floor panels.

Preferably, the drainage protrusions comprise elongated ribs, wherein the length of the ribs is dependent on the dimension of the panel. Preferably, the ribs shall have an outer distance to the panel from 5-25 mm.

The named preferred dimensions for width, height and length and distance of the drainage protrusions can be combined arbitrary.

Preferably, the ribs comprise a particular semi-circular cross-section. Semi-circular in this respect means herein each form of non-angled but curved circular shape, and in particular a part circle or part ovals or the like.

As a material for the carrier plate preferably MDF or HDF boards of acetylated wood are used as well as fiber cement boards or boards based on PVC or WPC (wood-plastic composite) as well as fiber boards of mineral wool. These materials are well suited for the use e.g. in the outdoor area and in the same time weather resistant, particularly with regards to moisture.

MDF or HDF boards of acetylated wood are in particular preferred. Acetylated wood is generally known in the art. During acetylation, the wood respectively the wood fibers, which are used to produce the MDF or HDF boards, are treated in a chemical process with acetic anhydride. Thereby, the structure of the wood is permanently changed and in particular the moisture absorption of such treated wood fibers is significantly reduced. MDF or HDF boards of such treated wood are surprisingly weather resistant and excellently suitable for the use in outdoor areas or in wet areas (bathing rooms, wellness areas, swimming pools etc.).

It has generally shown that fiber cement boards are also generally suitable, which are known from supplier under the trade name Eternit. Fiber cement boards can be processed easily and in particular provided on their edges with coupling means. Further, it has shown that the carrier plates based on PVC or WPC are also well suited in combination with the inventive drainage protrusions. Very suitable are further fiber boards based on mineral wood fibers, such as distributed by the company Rockpanel.

Preferably a décor or protective layer is provided on the front face, which is chosen from the group composed of: radiation cured acrylate containing foil, or a polymer layer having a hardness gradient, wherein the hardness of the polymer layer decreases in particular continuous with increasing depth seen from the surface of the polymer layer.

The décor respectively protective layer can consist of a radiation cured poly-acrylate containing foil. The foil is in particular based on paper that is impregnated and/or coated with a radiation curing acrylate system. A radiation curing can be provided for example by treatment with electron rays or UV rays. Such foils are for example commercially available from company DTS Systemoberflächen GmbH under the tradename "Elesgo". A decorative polypropylene foil can also be used as foil, which comprises on the visible face a décor for example in form of a wood décor. The décor imprint is again protected by radiation curable acrylate lacquers, which are at the same time respectively weather proof. Such foils are commercially available. As an alternative for these special foils, it has shown that a polymer layer with hardness gradient comprises the necessary weather resistance properties, which are necessary for a floor panel e.g. for the outdoor area. The manufacturing of a polymer layer with hardness gradient according to the present invention is for example described in detail in WO 2008/061 791 of the same applicant, which is incorporated entirely by reference. From the above it will become apparent that the décor respectively protective layer is not necessarily a single layer but rather can comprise multiple different layers, which cooperate to provide a protective function.

Using a foil for a décor respectively protective layer, this layer is preferably adhered by means of an adhesive and in particular by means of a polyurethane adhesive (such as polyurethane melt adhesive) on the front face of the carrier plate. Polyurethane adhesives are particularly suitable and increase the resistance of the composite against weather influences. In all embodiments described herein, it is preferred that the foil itself is imprinted with a decorative pattern such as a real wood décor or a stone- or a tile décor. Alternatively, it is also possible that the foil is used without an own decorative décor, such that it serves as pure protective layer.

Preferably, fiber cement boards are provided on their rear face with a water impermeable layer to block the liquid entry of water. Fiber cement boards have a very high density. Already the one sided entry of small amounts of water results in a bending of the panels to the front face, such that the optical impression of the installation is disturbed. The blocking of the rear face can e.g. be provided by an acrylate lacquer or a PVC foil can be laminated by means of a polyurethane melting adhesive. A glass non-woven, which is applied with polyurethane adhesive also provides a very good protection. When using a carrier plate based on a fiber cement board, preferably a glass non-woven and water impermeable foil such as for example PVC or an acrylate coating is applied on the rear face of the fiber cement board.

The carrier plate has preferably a thickness between 3-20 mm, even more preferably between 4-15 mm and still more preferably between 4-12 mm, most preferably between 5-10 mm. These thicknesses are suitably designed, such that a coupling means in form of groove and tongue elements in the sides of the carrier plates can be included and the carrier plates have a sufficient strength, so that floor panels are very resilient. At the same time, the carrier plate is thin enough, so that relatively little material is needed and a complete panel is not too heavy, such that they are easy to process or to install.

The present invention also relates to the use of a panel for manufacturing a flooring, in particular in the outdoor area, wherein the above described panels are installed by connecting the panels via the respective coupling means. Due to the drainage protrusions, provided on the rear face of the carrier plate, the panels can be advantageously installed without using a gravel, sand or gritting material bed on a flat and solid ground.

The person skilled in the art understands that on the rear face of the carrier plate further layers or films such as reinforcement layers, moisture protective layers, impact sound insulation layers and so on can be provided, and that the drainage protrusions on the rear face of the carrier plate are applied on these additional layers. It is just essential that the drainage protrusions can fulfill their functions, i.e. the drainage of liquids respectively rain or leakage water, when the floor panels are installed.

DESCRIPTION OF PREFERRED EMBODIMENTS

In the following, the invention is described in detail based on the figures, wherein.

Figure 1A:
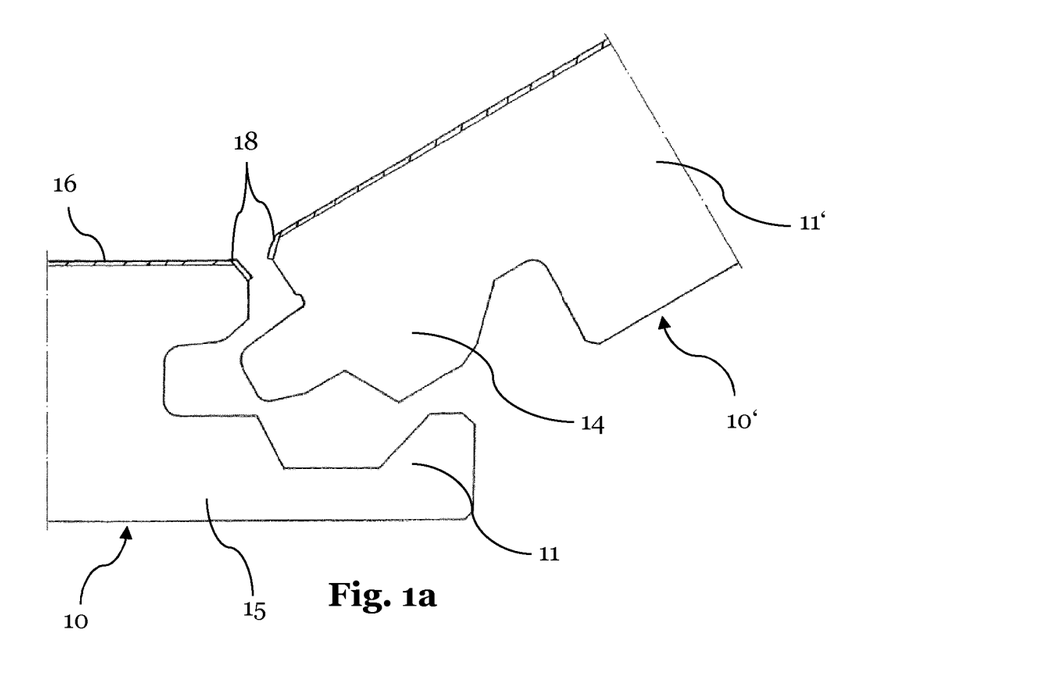
FIGS. 1A and 1B show schematic cut-views of coupling means of two similar floor panels.
Figure 1B:
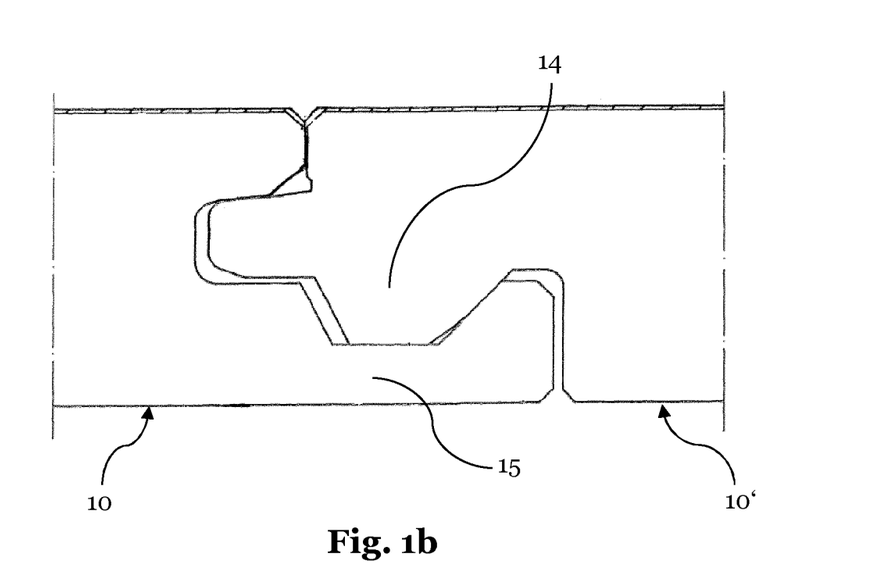

In FIG. 1 two similar floor panels 10 and 10' are shown in partly cut schematic views, just before they are interconnected with each other. The panels 10 and 10' comprise a carrier plate 11, 11', which are provided either according to the invention from fiber cement boards, polyvinyl, MDF or HDF boards of acetylated wood, WPC or fiber boards based on mineral wool fibers. The panels are provided on their edges with coupling means in form of groove elements 14 and tongue elements 15, which allow a connection of several panels in a direction parallel to the front face as well as perpendicular to the front face by form fit. Thereby, on each panel a tongue element 14 is provided on a longitudinal edge and a respective groove element 15 is provided on the opposite longitudinal edge. On the transverse edges typically complimentary coupling means are provided, which allow a connection between two panels by a simple lowering. Details of such latching profiles are known to the person skilled in the art in the field of laminate floor manufacturing, such as for example from WO 0 188 306 or WO 0 148 332 of the same applicant, which content is herein incorporated by reference in its entity. As the person skilled in the art will derive further from FIG. 1b, in which 10 and 10' are shown in the connected state, it is not possible in this connected state to separate both panels from each other by a horizontal shifting to the left or to the right of FIG. 1b, nor is it possible to loosen the right panel 10' by a mere perpendicular lifting from the connection with the left panel 10. A loosening of the panels is therefore only possible by means of an angular movement, as it is implied in FIG. 1. On the front face of the panels, a décor respectively protective layer 16 is provided, which can consist according to the invention of a radiation cured acrylate containing foil or of a polymer layer with a hardness gradient. The layer 16 is preferably provided with a decorative pattern such a real wood imitation, or rather it is transparent and allows the view on an underlying décor which can for example be provided directly on the front face of the carrier plates.

Figure 2A:
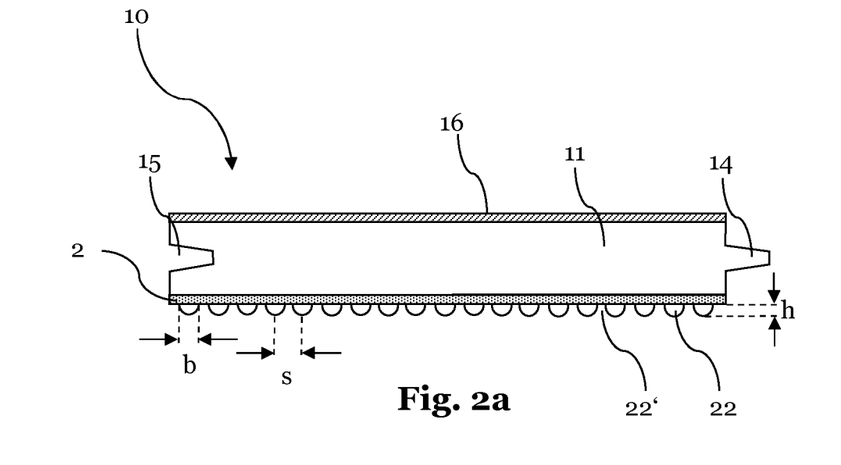
FIGS. 2a-2c show schematic cut-views of different embodiments of drainage protrusions.
Figure 2B:
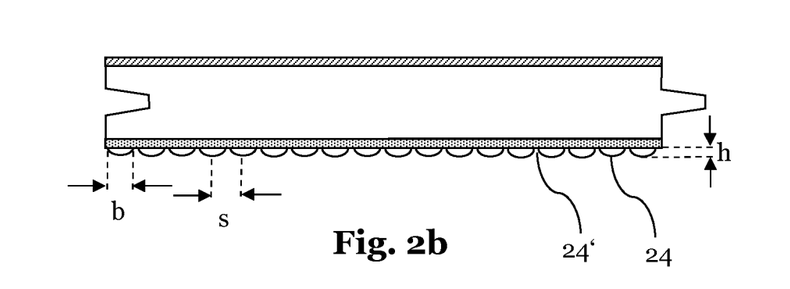
Figure 2C:
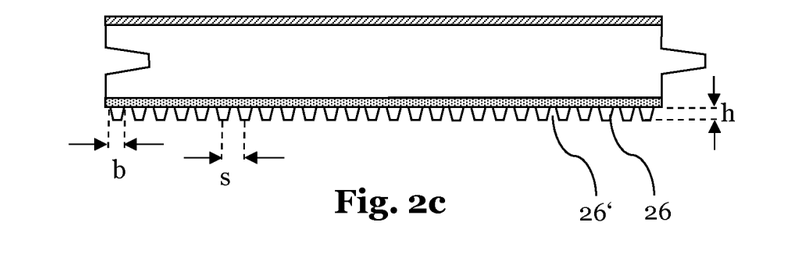

In FIGS. 2a-2c, a schematic cut view of the panels with different types of drainage protrusions are shown. The panels 10 are provided on their sides with groove and tongue elements 15, 14 and are provided on their top face with a décor or protective layer 16. On the rear face of the carrier plate 11, a moisture resistant protection layer 20 is provided. Further, a number of drainage protrusions 22 is provided, which are shown in a cross section and which can extend into the drawing plane over the entire length of the panel 10. The shown drainage protrusions are therefore formed as longitudinal ribs and have for example a width b from 2-10 mm and a height h from 2-10 mm. The distance between two peaks s of adjacent drainage ribs 22 is preferably between 2-15 mm. The drainage ribs 22 are provided parallel to each other and have in particular a semi-circular cross section. Due to the parallel arrangement between two adjacent ribs 22, open channels 22' are formed, which serve for the drainage of water, such as rain or splash water. The ribs 22 can extend without interruptions over the entire length or width of a panel, or can be provided with interruptions, as can be better derived from the views of FIGS. 3a to 3f. In FIG. 2b, also drainage protrusions are provided in form of longitudinal ribs 24 which have in particular a semi-circular cross section, wherein the cross section of the ribs 24 rather is pitch circle. Also in this respect open channels 24' are formed. In FIG. 2c, the drainage protrusions formed as ribs 26 have a truncated cross section. Also, in this embodiment, the ribs 26 are arranged parallel to each other and define therebetween open channels 26' for the drainage of water.

Figure 3A:
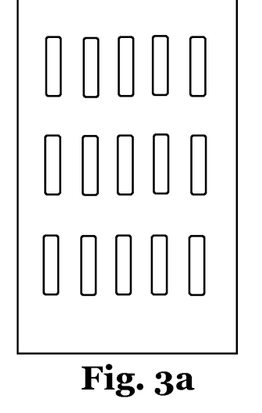
FIGS. 3a-3f show schematic top-views of different embodiments of drainage protrusions, and FIG. 4 schematically shows a device for applying drainage protrusions on the rear face of carrier plates.
Figure 3B:
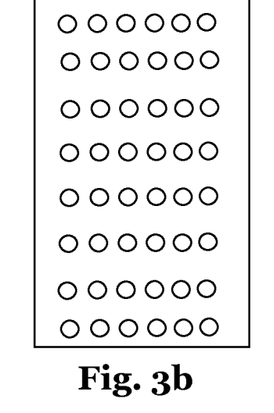
Figure 3C:
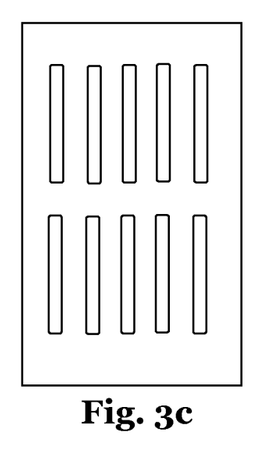
Figure 3D:
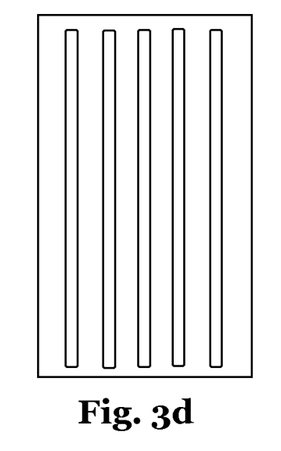
Figure 3E:
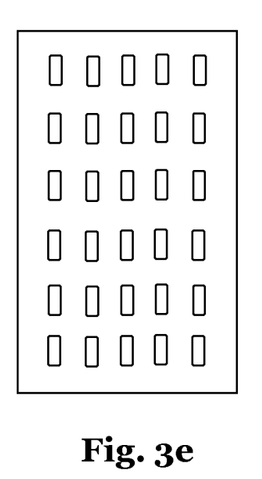
Figure 3F:
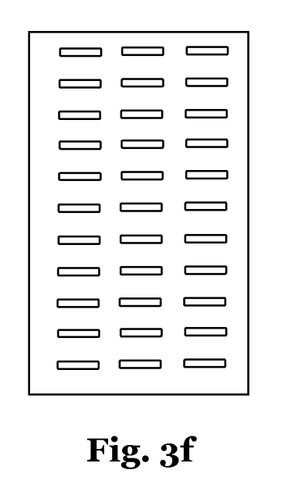

FIGS. 3a-3f show schematic top views of different drainage protrusions, which are differently and mere exemplarily formed and arranged. In FIG. 3a, 15 longitudinal drainage protrusions are shown, which are arranged in five parallel rows. In other words, the embodiment of FIG. 3a shows five long parallel ribs, wherein each rib comprises two gaps. The figures are not necessarily in scale. In reality, the single ribs are for example just a few centimeters in length and a few millimeters in width, wherein the panel for example is 2 m long and 40 cm in width. However, the schematic views illustrate well that different amounts and dimensions of drainage protrusions are possible in the scope of the invention. In FIG. 3b, the drainage protrusions are formed as points or as knobs. Also in this regard, the protrusions are preferably arranged in rows respectively columns. Such arrangements result in a simple manner with the use of nozzles for the application of protrusions that is described in detail with regard to FIG. 4. Generally, it is preferred that more than 100 drainage protrusions are applied per $m^2$, even more preferred 200 per $m^2$ and still more preferred, more than 400 per $m^2$ and most preferred more than 600 per $m^2$. In FIG. 3c in particular long ribs are used and in FIG. 3d the ribs are formed universally without interruptions. In the embodiment of FIG. 3e, the protrusions are provided in form of many short ribs and in FIG. 3f the extension of the ribs is perpendicular to the longitudinal direction of the panels. The person skilled in the art will understand that the FIGS. 3a to 3f are mere exemplarily and that in the scope of the invention, there are almost infinite possibilities of modification.

Figure 4:
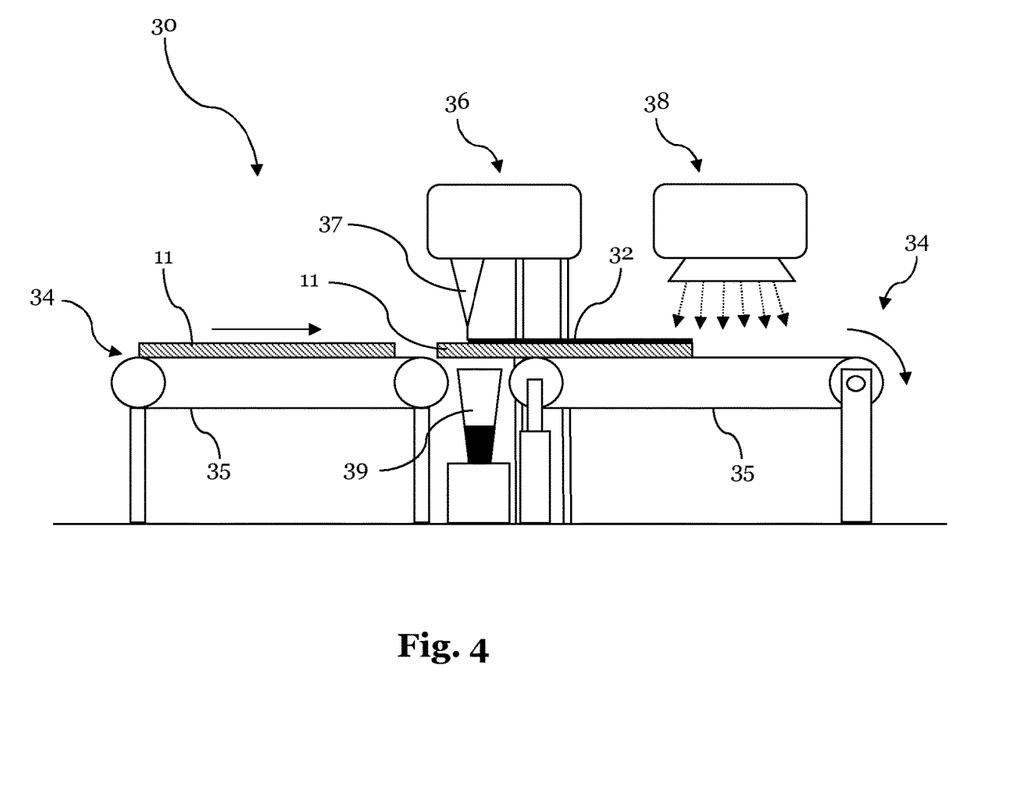

In FIG. 4 a schematic device 30 for applying drainage protrusions 32 on the rear face of the carrier plate 11 is shown. The carrier plates 11 are transported over the transportation device 34 in direction of the arrow through the device 30. The transportation devices 34 comprise revolving conveyor belts 35. Reference sign 36 references an application device, which comprises a plurality of parallel arranged nozzles 37, with which adhesive strips are applied on the rear face of the carrier plate 11. The adhesive is applied by the nozzles 37 uniformly and, since the carrier plates 11 are transported under the adhesive jet, parallel, longitudinal ribs 32 are formed on the rear face of the carrier plate 11, which consists of the applied adhesive. Using multiple parallel nozzles 37, in one step multiple parallel adhesions ribs 32 (i.e. drainage ribs) can be applied on the rear face of the carrier plate 11. Alternatively, and in particular preferred, the nozzles are clocked and apply always just short material strips. Thereby, points or longitudinal ribs are formed as drainage protrusions, which can be in the range of the technical possibilities as short as required. With reference sign 38 a device for drying the applied adhesive strips respectively adhesive ribs is provided. This device can utilize, for example hot air or electromagnetic radiation, or the like, in order to cure the applied adhesive strips respectively ribs 32. Reference sign 39 references a collection device, into which excess adhesive can run-off. The present description serves for better understanding of the invention. The scope of protection is defined by the accompanying claims.

The invention claimed is:

1. A floor panel for an outdoor area or for wet areas, the floor panel comprising:
   a carrier plate with a front face and a rear face, wherein the carrier plate is provided with a décor and/or protective layer on the front face,
   wherein, on the rear face of the carrier plate, drainage protrusions are applied, wherein the drainage protrusions are separate components which are adhered to the rear face with a melt adhesive, wherein no melt adhesive has been applied on the rear face between the drainage protrusions, wherein the melt adhesive is an adhesive selected from a group of polyurethanes or thermoplastic melt adhesives, wherein the drainage protrusions comprise longitudinal ribs and the longitudinal ribs have a width from 2 to 40 mm,
   wherein the longitudinal ribs have a height h from 2 to 10 mm,
   wherein the longitudinal ribs are arranged parallel to each other and define open channels therebetween,
   wherein a distance between peaks of the longitudinal ribs is between 2 to 10 mm, and in that
   the décor and/or protective layer is chosen from the group consisting of:
      a radiation cured acrylate containing foil;
      a foil based on polypropylene;
      a polymer layer with hardness gradient, wherein the hardness of the polymer layer continuously decreases with increasing depth, seen from the surface of the polymer layer.

2. The floor panel according to claim 1, wherein the melt adhesive is a reactive adhesive from the group of polyurethanes or thermoplastic melt adhesives with a heat resistance of at least 45° C.

3. The floor panel according to claim 1, wherein the longitudinal ribs comprise multiple interruptions in a direction of a longitudinal extension of the longitudinal ribs.

4. The floor panel according to claim 1, wherein the longitudinal ribs have a semi-circular cross-section.

5. The floor panel of claim 1, wherein more than 100 drainage protrusions per $m^2$ are provided.

6. The floor panel of claim 1, wherein a material of the carrier plate is chosen from a group consisting of:
   MDF or HDF board of acetylated wood;
   Fiber cement boards;
   Polyvinylchloride;
   Carrier plate based on WPC;
   Fiber boards based on mineral wool fibers with a density of 750-1500 $kg/m^3$.

7. The floor panel according to claim 1, wherein the décor and/or protective layer is adhered to the front face of the carrier plate by a polyurethane adhesive.

8. The floor panel of claim 1, wherein the carrier plate is a fiber cement board and on the rear face of the fiber cement board a glass non-woven, a water impermeable foil including a PVC, or an acrylate coating is applied.

9. The floor panel according to claim 1, wherein the carrier plate has a thickness between 3 and 20 mm.

10. The floor panel according to claim 1, wherein the carrier plate has sides comprising groove and tongue elements, which allow a connection of multiple similar panels in a direction parallel to the front face as well as perpendicular to the front face by form fit.

11. A method of constructing a flooring surface, the method comprising the steps of:
providing a plurality of panels according to claim 1; and
installing the panels by connecting the panels.

12. The method according to claim 11, wherein installing the panels includes installing the panels on a flat and solid floor without using a gravel, sand or gritting material bed.

13. A floor panel for an outdoor area or for wet areas, the floor panel comprising:
a carrier plate with a front face and a rear face, wherein the carrier plate is provided with a décor and/or protective layer on the front face,
wherein, on the rear face of the carrier plate, drainage protrusions are applied, wherein the drainage protrusions are separate components on the rear face and consist of a melt adhesive, wherein no melt adhesive has been applied on the rear face between the drainage protrusions, wherein the melt adhesive is an adhesive selected from a group of polyurethanes or thermoplastic melt adhesives, wherein the drainage protrusions comprise longitudinal ribs and the longitudinal ribs have a width from 2 to 40 mm,
wherein the drainage protrusions longitudinal ribs have a height h from 2 to 10 mm,
wherein the longitudinal ribs are arranged parallel to each other and define open channels therebetween,
wherein a distance between peaks of the longitudinal ribs is between 2 to 10 mm, and in that
the décor and/or protective layer is chosen from the group consisting of:
a radiation cured acrylate containing foil;
a foil based on polypropylene;
a polymer layer with hardness gradient, wherein the hardness of the polymer layer continuously decreases with increasing depth, seen from the surface of the polymer layer.

14. A method for manufacturing a floor panel according to claim 13, the method comprising the following steps:
providing the carrier plate with a front face and a rear face;
applying groove and tongue elements on sides of the carrier plate;
providing the décor and/or protective layer on the front face of the carrier plate, wherein in a further step, on the rear face, the melt adhesive protrusions are applied as separate components, wherein no melt adhesive is applied on the rear face between the drainage protrusions, and thereafter are cured in order to form longitudinal drainage ribs,
wherein the longitudinal ribs have a width from 2 to 40 mm,
wherein the longitudinal ribs have a height h from 2 to 10 mm,
and wherein the longitudinal ribs are arranged parallel to each other and define open channels therebetween and wherein a distance between peaks of the longitudinal ribs is between 5 to 10 mm.

* * * * *